July 2, 1968     C. F. PHILLIPS, JR     3,391,403

DIGITAL OPTIMUM WEIGHTED STATISTICAL DETECTOR

Filed Feb. 24, 1967

WITNESSES:
Bernard R. Giegues
James F. Young

INVENTOR
Calvert F. Phillips, Jr.
BY
Dean Schron
ATTORNEY

United States Patent Office 3,391,403
Patented July 2, 1968

3,391,403
DIGITAL OPTIMUM WEIGHTED STATISTICAL DETECTOR
Calvert F. Phillips, Jr., Annapolis, Md., assignor to Westinghouse Electric Corporation, Pittsburgh, Pa., a corporation of Pennsylvania
Filed Feb. 24, 1967, Ser. No. 618,454
8 Claims. (Cl. 343—5)

ABSTRACT OF THE DISCLOSURE

Apparatus for the automatic processing of radar data whereby radar targets are detected and reported to a computer in binary form. Analog video information of a plurality of radar hits per beamwidth is quantized and fed into magnetostrictive delay lines and then quantized a second time according an optimum weighting function which corresponds to the shape of the antenna pattern. Only one report per target is sent to the computer for a plurality of radar hits.

While prior art apparatus is known and described for automatic processing of radar information, optimum weighted digital statistical detection of a radar target is not achieved. For example, note is made of U.S. Patent No. 3,264,645 issued to G. Hotz and U.S. Patent No. 3,155,912 issued to S. Applebaum et al. Whereas the Hotz patent describes a circuit arrangement for processing incoming digitalized radar pulse sequences, it operates on a series of digitalized radar pulse sequences in such a manner that interrupted pulse sequences are regenerated and then applied to additional apparatus for decreasing the size of the data blocks generated. The Applebaum et al. patent relates to automatic processing apparatus for radar data wherein the input pulse train is quantized and fed to a tapped delay line whereupon a new train of pulses are produced as a result of a summing action occurring at the output at the delay line. While both of the above-mentioned patents utilized similar components they are uniquely arranged to perform their desired functions. However, the above apparatus is inherently incapable of detecting a radar target by means of optimum weighted digital statistical detection.

Accordingly, it is an object of the present invention to provide improved means for the automatic processing of radar data.

It is another object of the present invention to provide means for detecting and reporting a radar target to a digital computer in binary form with only one report per target being provided.

It is also another object of the present invention to provide means for digitally detecting and reporting radar targets to a computer where the input information is received in analog form for processing by a digital computer.

Still another object of the present invention is to provide an improved means for detecting and reporting of a radar target while minimizing false target returns as well as providing information as to the position of the radar target during a single scan of the radar antenna.

Briefly, the subject invention utilizes means for digitally processing radar target information in combination with magnetostrictive digital delay lines. Assuming that there are a plurality of radar hits per beamwidth of the antenna pattern, an analog video radar pulse corresponding to each hit is coupled to a multi-level quantizer circuit which weights the analog information to determine the probability of detection over noise which is a substantially constant amplitude function. The output of the multi-level quantizer is fed into a summing means and then to a plurality of magnetostrictive digital delay lines coupled together in series. The quantized radar signals now comprise digitalized signals which are fed to the delay lines. Assuming that each delay line has a delay equal to the inter-pulse period of the radar, the plurality of digitalized pulses during a radar scan are successively stored in the delay line chain so that when a predeterminder number of hits per beamwidth occur, outputs appear at the output taps of the delay lines with the last hit being provided at the input of the first delay line. A plurality of second quantizer means are coupled to the input and output of each of the delay lines and the quantizers are optimumly weighted in accordance with the shape of the antenna pattern of the radar and generally have a respective threshold value such that the terminal quantizers have a threshold value which is less than the intermediate quantizers with the maximum threshold being established near the centermost quantizer. The respective output of each of the plurality of quantizers are fed to a majority gate such that when a predetermined number of all of the plurality of quantizer threshold values are exceeded according to the optimum threshold function established an output will be translated in digital form to a computer indicating that a true target has been detected.

Other objects and advantages of the present invention will become apparent when considering the following description taken in conjunction with the accompanying drawing in which.

Figure 1:
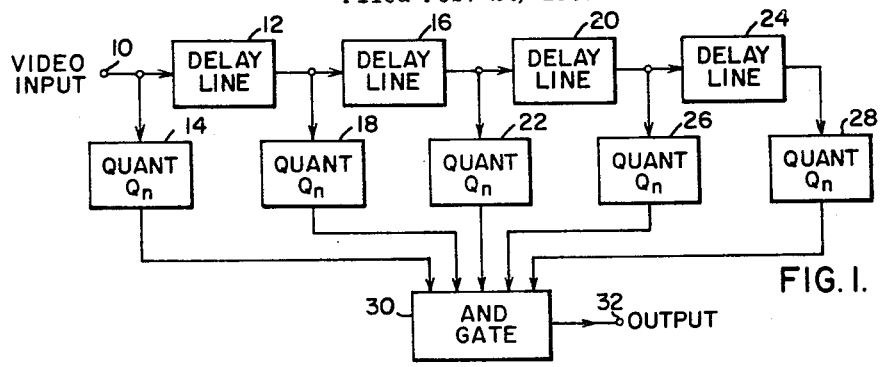
FIGURE 1 is a block diagram of a digital integrator with weighting.

Referring now to the drawings and more particularly to FIG. 1 there is shown an input terminal 10 for purposes of receiving a video input signal. Input terminal 10 is commonly coupled to the delay line 12 and a quantizer circuit 14 having a threshold level of $Q_n$. The output of the delay line 12 is coupled into a second delay line 16 and to a second quantizer 18 also having a threshold level of $Q_n$. The output of delay line 16 is fed into a third delay line 20 and a third quantizer circuit 22 having a threshold level of $Q_n$. Finally, the output of delay line 20 is fed to the delay line 24 and simultaneously to a fourth quantizer circuit 26. The quantizer 26 has a threshold of $Q_n$ just as the quantizer circuits 14, 18 and 22. The output of delay line 24 is coupled to a fifth quantizer 28 also having a threshold value of $Q_n$. The outputs of the quantizers 14, 18, 22, 26 and 28 are supplied as inputs to an AND gate circuit 30 having an output terminal 32.

The weighted integration of a plurality of video input pulses applied to input terminal 10 occurs in the following manner: whenever the amplitude level of a signal applied to a quantizer, for example quantizer circuit 14, reaches an amplitude level corresponding to the threshold level $Q_n$ an output signal will be present on the line coupled to the AND gate 30. By making the time delay of each of the delay lines 12, 16, 20 and 24 of the same value, a regular occurring pulse train appearing at input terminal 10 will be translated through the delay lines at an interval equal to the inter-pulse delay of the pulse train, i.e. when the first pulse appears at the output of delay line 12 the second pulse will be appearing at the input terminal 10. It then can be seen that, for example, where four delay lines are included such as shown in FIG. 1 and five pulses have been applied to input terminal 10, the first pulse will appear at the output of delay line 24 when the fifth pulse arrives. Additionally, if the amplitude of all of the pulses exceeds the common threshold level of $Q_n$ simultaneous inputs will appear at the AND gate 20 from all of the quantizers 14, 18, 22, 26 and 28 and an output signifying that fact will appear at terminal 32.

Figure 2:
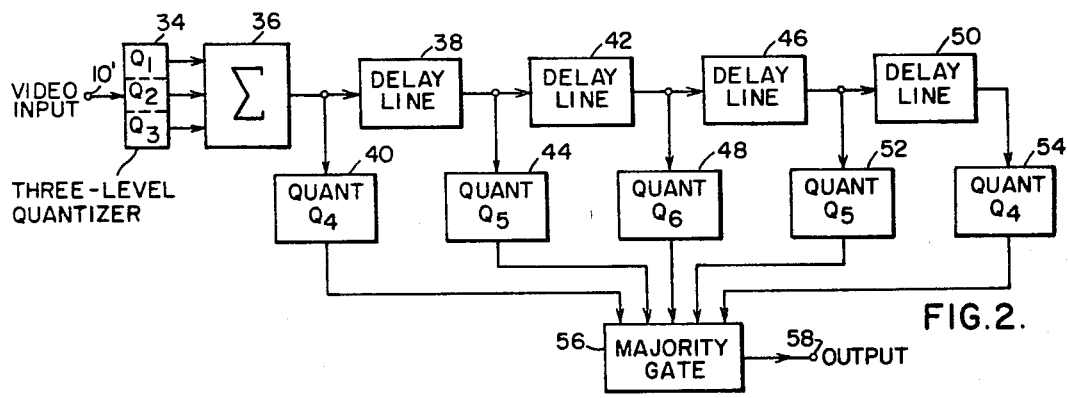
FIG. 2 is a block diagram of a preferred embodiment of the subject invention.

Referring now to FIG. 2 which is a block diagram of the preferred embodiment of the subject invention an input terminal 10' is coupled to a multi-threshold level quantizer circuit 34 having a plurality of threshold levels $Q_1$, $Q_2$ and $Q_3$. Three threshold values are shown for the purposes of illustration only and it should be noted that, when desirable, any number of threshold levels can be utilized. The outputs from the quantizer circuit 34 are coupled to a summing circuit 36 such that when the amplitude of the video input circuit exceeds a threshold level of $Q_1$ a first output will be coupled to the summing 36 and when the amplitude exceeds both threshold levels $Q_1$ and $Q_2$, two output signals will be fed to the summer. Accordingly, then when the threshold level $Q_3$ is exceeded three outputs are fed to the summing network 36. The output of the summing circuit 36 then is a digital output with each output having an amplitude in accordance with the level or levels exceeded in the quantizer 34. The output of the summing circuit 36 is commonly fed to a first magnetostrictive delay line 38 having a delay time equal to the period T of the pulse repetition frequency (PRF) of the video radar input pulse train. Commonly connected to the input of the first delay 38 and the output of the summing network 36, is a first quantizer circuit 40 having a threshold value of $Q_4$. A second delay line 42 is coupled to the output of the first delay line 38 and to a second quantizer circuit 44 having a threshold level of $Q_5$. A third delay line 46, which may be termed the $n-1$ delay line out of the number $n$ delay lines, is coupled to the output of the second delay line 42. A third or mid-point quantizer 48 having a threshold level of $Q_6$ is coupled to the output of delay line 42. A fourth delay line 50 which may be the last delay line of $n$ delay lines is coupled to the output of the delay line 46. Also a fourth quantizer 52 having a threshold level of $Q_5$ is commonly coupled to output of delay line 46 and the input delay line 50, and a fifth quantizer circuit 54 having a threshold level $Q_4$ is connected to the output of delay line 50. The quantizer 54 could be termed the $n$th quantizer of a number of $n$ quantizers. The outputs of the quantizer circuits 40, 44, 48, 52 and 54 are applied to a majority gate circuit 56 which has an output terminal 58.

It is contemplated that the desirable number of $n$ quantizers utilized would be one quantizer for each hit per beamwidth of the radar. By selectively choosing all of the time delays of the delay lines 38, 42, 46 and 50 to be equal to one period of the PRF which could be termed the inter-pulse delay, all of the pulses for one beamwidth or scan would pass through the quantizer 34, the summer 36, and successively appear at the output of a respective delay line 38 through 50.

Figure 3:
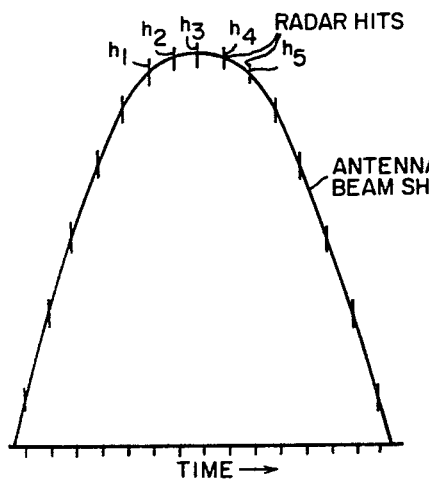
FIG. 3 is a diagram helpful in understanding the subject invention.
Figure 4:
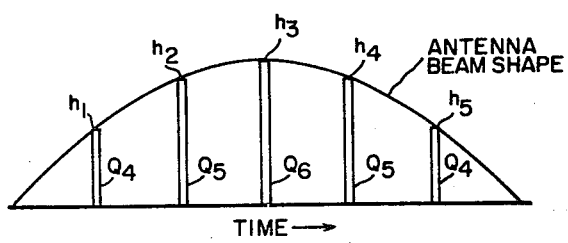
FIG. 4 is an illustrative diagram of waveform also helpful in understanding the invention.

The quantizing levels $Q_4$, $Q_5$, $Q_6$, etc. are selectively chosen so that the amplitude distribution has the same taper or shape as the radar antenna pattern. This is illustrated in FIGS. 3 and 4. Referring to FIG. 3, the antenna beam shape and a plurality of radar hits $h_1$, $h_2$, $h_3$ etc. are shown appearing equally spaced in time over the beam shape by choosing for sake of illustration the five radar hits at the center of the antenna beam, $h_1$, $h_2$, $h_3$ and correlating these to the threshold levels $Q_4$, $Q_5$ and $Q_6$ as shown in FIG. 4, the quantizer levels become a function of the antenna beam shape and an optimum weighting detection is achieved. When respective digitalized signals appear at the quantizers 40, 44, 48, 52 and 54, inputs corresponding thereto will appear at the input of the majority gate 56. Depending upon the number of inputs chosen as a majority figure, an output will appear at terminal 58.

It will be seen that the quantizing levels $Q_4$, $Q_5$ and $Q_6$ have levels whereby the terminal quantizers have a relatively lower threshold value than the centermost quantizers. By utilizing this configuration, the probability of target detectability will improve for any particular signal to noise ratio signal having the antenna amplitude distribution function similar to the quantizer settings. Also, since noise is a relatively constant amplitude function the weighting process performed at the multi-level quantizer 34 increases the probability of detection still further.

What has been shown and described therefore is a detector for a plurality of radar hits per beamwidth which produces radar pulses that are digitalized and weighted on a scan-to-scan basis. Also, by means of optimum weighting of the quantizers 40, 44, 48, 52 and 54 as shown, the midpoint of the target is automatically determined.

While it has been shown and described what is at present considered to be the preferred embodiment of the invention, modifications thereto will readily occur to those skilled in the art. It is not desired therefore that the invention be limited to the specific arrangement shown and described, but it is to be understood that all equivalents, alterations and modifications within the spirit and scope of the invention are herein meant to be included.

I claim as my invention:

1. Apparatus for detecting and reporting a radar target to a computer from a plurality of radar hits per beamwidth of an antenna pattern comprising in combination:
   (a) input means for receiving analog video radar pulses corresponding to each hit of the said plurality of radar hits;
   (b) quantizer means coupled to said input means for providing an output pulse having a predetermnied amplitude level of a plurality of amplitude levels in response to the amplitude of each of said radar pulses;
   (c) summing means coupled to said quantizer means providing a digital output signal in response to the amplitude level exceeded of said plurality of amplitude levels;
   (d) a plurality of delay lines, having a time delay substantially equal to the inter-pulse delay time of said radar pulses, coupled to said quantizer means for sequentially storing and translating said plurality of radar pulses as quantized;
   (e) weighted quantizer means coupled to said plurality of delay lines and having an optimum weighting function related to said antenna pattern in the form of a predetermined threshold level for each of said delay lines; and
   (f) gating means coupled to said weighted quantizer means providing an output signal to said computer in the event a predetermined number of said delay lines simultaneously couples a signal of a respective predetermined threshold level to said weighted quantizer means.

2. Apparatus for detecting and reporting a radar target to a digital computer from a plurality of radar hits per beamwidth of the antenna pattern comprising in combination:
   (a) input means for receiving said plurality of radar hits in the form of analog video radar pulses;
   (b) a multi-threshold level quantizer circuit having a plurality of threshold levels coupled to said input means for providing an output pulse therefrom having a predetermined amplitude level when said amplitude of each of said radar pulses exceeds one or more of said threshold levels;
   (c) summing means coupled to said multi-threshold level quantizer circuit for providing a digital output therefrom in response to the output from said quantizer circuit;
   (d) a plurality of digital delay lines each having a time delay substantially equal to the inter-pulse delay time of said radar pulses, connected in series to said multi-threshold level quantizer circuit for sequentially storing and translating said plurality of radar pulses as quantized;

(e) a plurality of threshold level quantizer means coupled to said plurality of delay lines each having a predetermined threshold level which is functionally related to the shape of the antenna pattern; and (f) gating means coupled to each of said threshold level quantizer means for providing an output signal to said computer in the event simultaneous pulses are applied to a majority of said plurality of threshold level quantizer means and having amplitudes exceeding the respective predetermined threshold levels.

3. The apparatus as defined in claim 2 wherein said plurality of digital delay lines comprises magnetostrictive delay lines.

4. The apparatus as defined in claim 2 wherein said multi-level threshold quantizer means comprises at least a three level threshold detector.

5. The apparatus as defined in claim 2 wherein said gating means comprises a majority gate.

6. The apparatus as defined in claim 2 wherein said plurality of threshold level quantizer means comprises a respective quantizer circuit coupled to the input and output of each of said plurality of digital delay lines and wherein each of said quantizer circuits has a predetermined threshold level wherein the threshold level of the terminal quantizer circuits have a relatively lower threshold level than the intermediate quantizer circuits.

7. The apparatus as defined in claim 2 wherein said plurality of digital delay lines comprises a number which is one less than the desired number of hits per beamwidth to be processed.

8. Apparatus as defined in claim 6 wherein the midpoint quantizer circuit has the greatest threshold level, the threshold levels of the quantizer circuits being in proportion to the beam shape of said antenna pattern for determining the center of said radar target.

References Cited

UNITED STATES PATENTS 3,353,177    11/1967    Wilmot _____ 343—5

RODNEY D. BENNETT, *Primary Examiner.*

C. L. WHITHAM, *Assistant Examiner.*